US012589565B2

(12) United States Patent
Van Beek

(10) Patent No.: US 12,589,565 B2
(45) Date of Patent: Mar. 31, 2026

(54) TIRE BUILDING MACHINE AND METHOD FOR INSPECTING A TIRE COMPONENT PRODUCED IN SAID TIRE BUILDING MACHINE

(71) Applicant: VMI HOLLAND B.V., Epe (NL)

(72) Inventor: Willem Marinus Van Beek, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 18/706,887

(22) PCT Filed: Oct. 31, 2022

(86) PCT No.: PCT/NL2022/050611
§ 371 (c)(1),
(2) Date: May 2, 2024

(87) PCT Pub. No.: WO2023/090999
PCT Pub. Date: May 25, 2023

(65) Prior Publication Data
US 2024/0416602 A1 Dec. 19, 2024

(30) Foreign Application Priority Data

Nov. 17, 2021 (NL) ..................................... 2029797

(51) Int. Cl.
B32B 41/00 (2006.01)
B29D 30/00 (2006.01)
F16P 3/08 (2006.01)
(52) U.S. Cl.
CPC ............ B29D 30/0061 (2013.01); F16P 3/08 (2013.01); *B29D 2030/0066* (2013.01)
(58) Field of Classification Search
CPC ........ B29D 30/0061; B29D 2030/0066; B29D 30/0016; F16P 3/08; G01M 17/02
(Continued)

(56) References Cited

U.S. PATENT DOCUMENTS

2014/0231024 A1 8/2014 Eidelberg et al.
2015/0239188 A1* 8/2015 Onimatsu ............ B29D 30/005
156/379

FOREIGN PATENT DOCUMENTS

CN 111531930 A 8/2020
EP 3219478 A1 9/2017
(Continued)

OTHER PUBLICATIONS

Capplus Technologies, Softgel Manufacturing Considerations to Maximize Your Operations, 2020, https://capplustech.com/process-information/ (Year: 2020).*
(Continued)

*Primary Examiner* — Michael N Orlando
*Assistant Examiner* — Joshel Rivera
(74) *Attorney, Agent, or Firm* — Workman Nydegger

(57) ABSTRACT

A tire building machine for producing tire components and a method for inspecting tire components produced in a tire building machine are provided. The tire building machine includes a machine housing that defines a production area, one or more handling machines in said production area and an inspection station that defines an inspection area for inspection by a human operator of one or more of the tire components produced in the tire building machine. The inspection station is provided with a first door for physically separating the inspection area from the production area and a second door for controlling human access to the inspection area from outside the production area.

24 Claims, 3 Drawing Sheets

(58) Field of Classification Search
USPC ..................... 156/60, 64, 350, 351, 378, 379
See application file for complete search history.

(56) References Cited

FOREIGN PATENT DOCUMENTS

| WO | WO-2013177443 A1 | * | 11/2013 | ............. | E05B 45/04 |
| WO | 2015097602 A1 | | 7/2015 | | |
| WO | 2017208093 A1 | | 12/2017 | | |

OTHER PUBLICATIONS

Decision to Grant from Corresponding Japanese Patent Application No. JP2023-513947, Oct. 21, 2024.
Notice for Reasons of Refusal from Corresponding Japanese Patent Application No. JP2023-513947, Apr. 23, 2024.
International Search Report from corresponding PCT Application No. PCT/NL2022/050611, Jan. 16, 2023.
Dutch Search Report from corresponding NL Application No. 2029797, Jun. 29, 2022.

* cited by examiner

TIRE BUILDING MACHINE AND METHOD FOR INSPECTING A TIRE COMPONENT PRODUCED IN SAID TIRE BUILDING MACHINE

BACKGROUND

The invention relates to a tire building machine for producing tire components and a method for inspecting a tire component produced in said tire building machine.

In known tire building machines, tire components are randomly, regularly and/or selectively inspected manually by a human operator. This requires interruption of the production process to allow entry of the human operator in a production area of the tire building machine. To minimize downtime, the tire components to be inspected are removed from the production area by the human operator and moved to an inspection station outside of the production area as the production process is resumed. After inspection, the tire components are returned to the production area for reintroduction into the production process or for waste disposal, requiring another interruption of the production process.

SUMMARY OF THE INVENTION

Although various virtual or optical safeguards, such as light screens or other safety sensors, are in place to interrupt the production process when a human operator enters the production area, said production area remains inherently unsafe for a human operator. In particular, even when the production process is interrupted, there is still a hazard of materials or objects falling or machine parts being interrupted in hazardous positions that can easily cause injury to the human operator.

Moreover, removal and reintroduction of the tire components to be inspected repeatedly interrupts the production process, thereby causing downtime in the tire building machine.

It is an object of the present invention to provide a tire building machine for producing tire components and a method for inspecting a tire component produced in said tire building machine, wherein the inspection can be performed more safely and/or with less downtime of the tire building machine.

According to a first aspect, the invention provides a tire building machine for producing tire components, wherein the tire building machine comprises a machine housing that defines a production area, one or more handling machines in said production area and an inspection station that defines an inspection area for inspection, in particular manual or visual inspection by a human operator, of one or more of the tire components produced in the tire building machine, wherein the inspection station is provided with a first door for physically separating the inspection area from the production area and a second door for controlling human access to the inspection area from outside the production area.

By physically separating the inspection area from the production area, the human operator can safely enter or reach into the inspection station through the second door, while the production process in the production area can continue without interruption. More in particular, the physical separation can protect the human operator from materials or objects moving or falling in the production area and from machine parts being stationary or moving in said production area in the vicinity of the inspection station.

Preferably, the first door is movable between a closed state in which the inspection area is physically separated from the production area and an open state in which the inspection area is accessible from the production area. With the first door in the open state, the one or more tire components to be inspected can be placed from the production area into the inspection area.

In one embodiment thereof the first door, in the open state, opens the inspection area for access by at least one of the one or more handling machines. Hence, the one or more tire components can be placed in and retrieved from the inspection area in an automated manner.

In another embodiment the first door, in the open state, opens the inspection area for access in a pick-and-place direction through a top of the inspection station. The one or more tire components can be conveniently lowered into and lifted from the inspection station by overhead machine parts, in particular by the aforementioned at least one of the one or more handling machines. Meanwhile, the first door, in the closed state, can effectively protect the human operator from objects or materials falling from said overhead machine parts on the top of the inspection station.

In another embodiment the tire building machine is provided with a door drive for moving the first door between the closed state and the open state. The first door can thus be opened automatically, semi-automatically and/or via a remote control.

In another embodiment the tire building machine comprises a door sensor for detecting one of the closed state and the open state of the first door. By checking the state of the first door, it can be prevented that the human operator is allowed access to the inspection station through the second door when the first door is still open and/or not fully closed.

In a further embodiment the production area has a footprint, wherein the inspection area at least partially overlaps with the footprint of the production area. Preferably, the inspection area is located completely within the footprint of the production area. In other words, the inspection area can form a part of the production area and/or be in an open connection with said production area when the first door is in the open state. At least one of the one or more handling machines can freely access the inspection area as if it were the production area. Consequently, the one or more tire components can be readily exchanged between the inspection area and the production area. In particular, no separate inspection station is required outside of the production area. The tire building machine can thus be more compact. Moreover, when the one or more tire components are returned to the production process after inspection, they can be readily retrieved from the inspection station without requiring a transfer of the tire components from an inspection station outside of the production area back into production area.

In a further embodiment the tire building machine is provided with an access request interface for requesting human access to the inspection area. The access request interface can relay an access request, which is then processed by the tire building machine to check if all conditions for human access have been met. An access request can also trigger an action via the access request interface, such as moving the first door from the open state towards the closed state.

In a further embodiment the tire building machine comprises a door lock for locking and unlocking the first door and/or the second door. The door lock at the first door can prevent unauthorized human access to the production area via the inspection station when the second door is open. The door lock at the second door can prevent human access to the inspection station through the second door when the inspection area has not yet been physically separated from the production area.

In a further embodiment the tire building machine is configured such that the first door and the second door are not open simultaneously during production of the tire components in the production area. The inspection station can thus be operated as a safety lock that only allows access to the human operator when the first door is closed and that prevents human access to the inspection station when the first door is open.

In a further embodiment the tire building machine comprises a control unit that is configured to control the tire building machine such that the first door and the second door are not open simultaneously during production of the tire components in the production area. The control unit can be electronically and/or operationally connected to one or more drives, sensors and/or other devices that control the operation of the tire building machine, including the opening, closing, locking and/or unlocking of the first door and the second door. The control unit may comprise a memory for storing computer-readable instructions and a processor for executing the computer-readable instructions. The instructions, when executed by the processor, can cause the control unit to control the tire building machine in the aforementioned manner.

Preferably, the tire building machine comprises a door lock for locking and unlocking the second door and a door sensor for detecting one of a closed state and an open state of the first door, wherein the control unit is operationally connected to the door lock and the door sensor for controlling the door lock to unlock only when the door sensor generates a signal indicative of the first door being in the closed state. The door lock can prevent human access to the inspection station through the second door when the signal received from the door sensor indicates that the inspection area has not yet been physically separated from the production area.

Additionally or alternatively, the tire building machine is provided with a door drive for moving the first door between a closed state and an open state and an access request interface for requesting human access to the inspection area, wherein the control unit is operationally connected to the door drive and the access request interface for controlling the door drive to move the first door to the closed state in response to an access request at the access request interface. Hence, the first door can be closed shortly thereafter, in particular at the earliest opportunity. This embodiment may be combined with the previous embodiment to unlock the second door based on the signals received from the door sensor. Hence, the unlocking of the door can be indirectly triggered by the access request, but only after the door sensor has detected that the first door is in the closed state.

In another embodiment the first door is a physical door, i.e. the first door has a closed physical surface, a grating or combination thereof. The first door, in its physical form, can absorb impacts from materials, objects and/or machine parts hitting the inspection station at the first door. In particular, the closed physical surface can effectively protect the human operator from such impacts. In case of a (partial) grating, the grating is dimensioned such that materials, objects and/or machine parts cannot easily pass through the grating. The first door may have a combination of a closed physical surface and a grating to provide ventilation between the production area and the inspection area or to allow the human operator to see through at least a part of the first door.

In another embodiment the second door is a physical door, i.e. the second door has a closed physical surface, a grating or a combination thereof. In contrast to a virtual door, such as a light screen, the physical form of the second door can prevent premature access of the human operator to the inspection station, for example when not all of the conditions for human access have been met. The (partial) grating may allow the human operator to see through the second door, for example to check if any tire components are placed in the inspection station, ready for inspection.

In a further embodiment the inspection station is provided with a drawer that can be partially pulled out of the inspection area through the second door. The drawer can present the one or more tire components to be inspected in a more convenient and/or ergonomic position to the human operator. More in particular, the one or more tire components can be inspected without taking them off the drawer, thereby maintaining the one or more tire components in their original position and/or order on the drawer. The one or more tire components can thus be reintroduced into the production process more reliably.

According to a second aspect, the invention provides a method for inspecting one or more tire components produced in a tire building machine according to any one of the embodiments according to the first aspect of the invention, wherein the method comprises the steps of:

placing the one or more tire components from the production area into the inspection area;

using the first door to physically separate the inspection area from the production area; and opening the second door for human access to the inspection area from outside of the production area when the inspection area is physically separated from the production area.

The method relates to the practical implementation of the tire building machine according to the first aspect of the invention and thus has the same technical advantages, which will not be repeated hereafter.

Preferably, the production of the tire components continues during the opening of the second door.

In other words, the production of the tire component continues during visual or manual inspection of the one or more tire components by the human operator in the inspection area.

In a further embodiment the first door and the second door are not opened simultaneously during production of the tire components in the production area.

In a further embodiment the method further comprises the steps of:

locking the second door; and unlocking the second door only when the first door is in a closed state.

In a further embodiment the method further comprises the step of:

closing the first door in response to an access request of the human operator.

In a further embodiment the method further comprises the steps of:

forming a stack of two or more of the tire components in the inspection area for inspection by the human operator;

starting and completing the inspection by the human operator; and reintroducing the two or more tire components from the stack in the inspection area into the production area;

wherein the human operator performs the inspection in such a way that the stack, after completing the inspection, holds the two or more tire components in the same order as prior to starting the inspection by the human operator.

In this manner, the tire building machine may assume that the order of the two or more tire components in the stack is still the same as it was prior to inspection and reintroduce the two or more tire components into the production process in accordance with the inspection results associated with the two or more tire components in said specific order.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
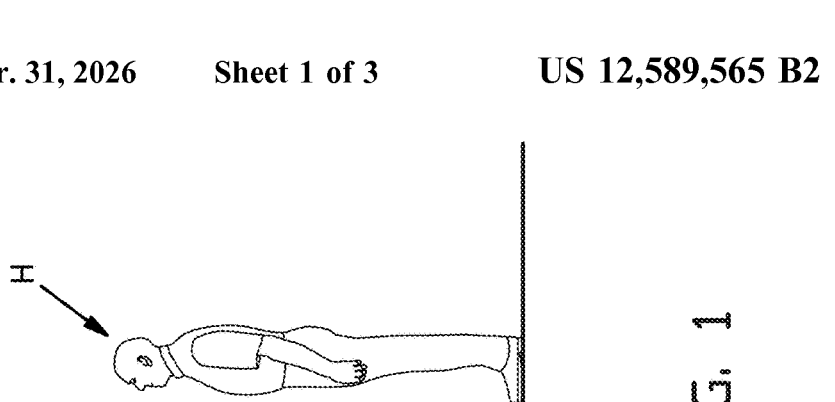
FIG. 1 shows a cross section of a tire building machine having a production area with one or more handling machines and an inspection area that is accessibly for at least one of the handling machines.
Figure 2:
FIG. 2 shows a cross section of the tire building machine of FIG. 1 in which the inspection area is inaccessible for the at least one handling machine and accessible for an operator.
Figure 3:
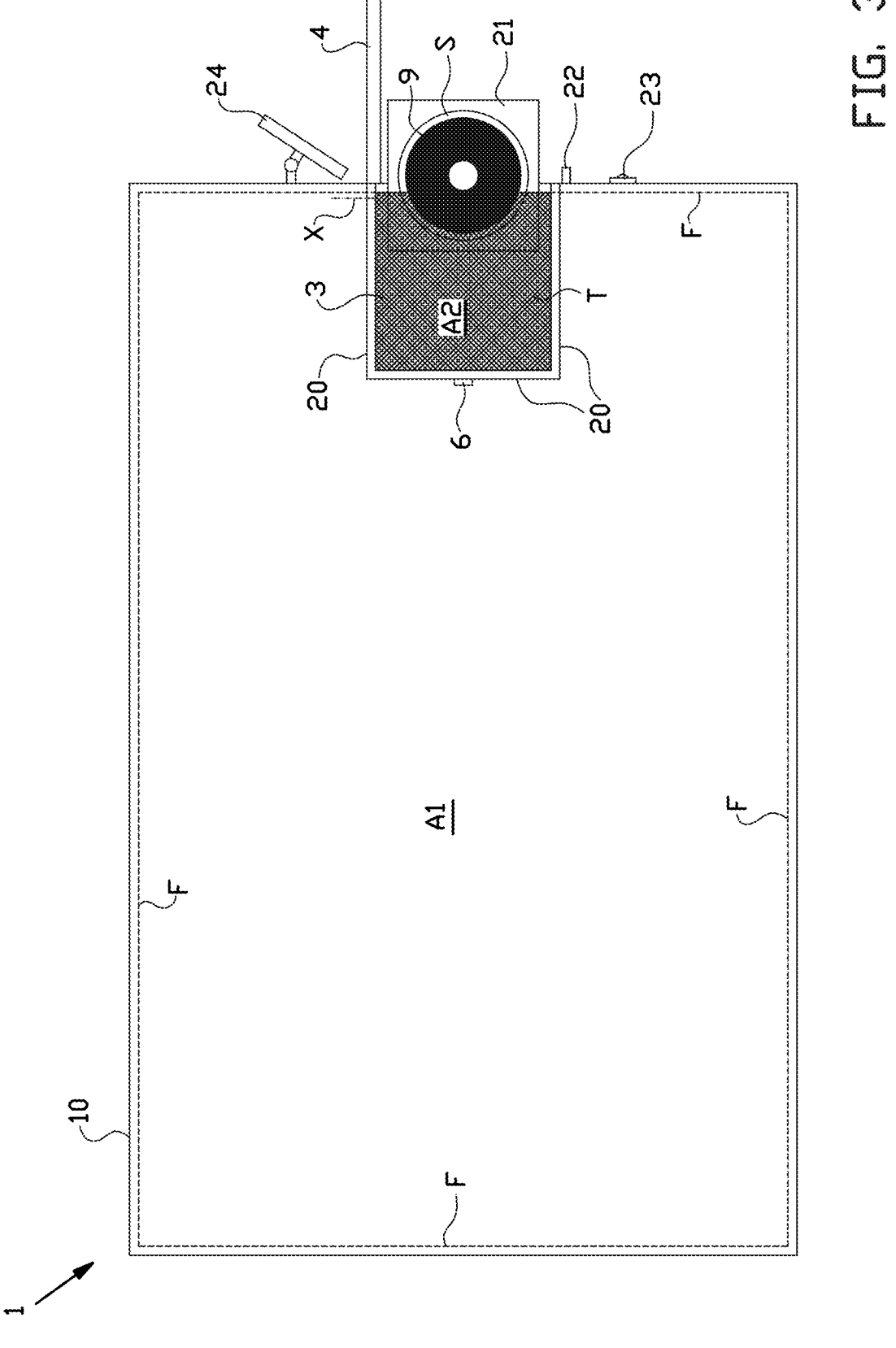
FIG. 3 shows a top view of the tire building machine of FIG. 2.

FIGS. 1, 2 and 3 show a tire building machine 1 for producing tire components 9, in particular beads, apexes, apex fillers or bead-apexes, which are used when assembling or building a green or unvulcanized tire.

The tire building machine 1 comprises a machine housing 10 that defines a production area A1 with a footprint F. The footprint F is the area occupied by the machine housing 10 on a factory floor. The production area A1 is typically provided with various virtual or optical safeguards (not shown), such as light screens or other safety sensors, to interrupt the production process when a human operator H enters the production area A1.

The tire building machine 1 is provided with one or more production devices or production machines 8, for example cutters, splicers, conveyors and/or drums, in the production area A1 for carrying out a production and/or assembly process. The tire building machine 1 further comprises one or more handling devices or handling machines R1, R2 in the production area A1 for transferring the tire components 9 between the one or more production machines 8, carriers C for carrying stacks of the tire components 9 and/or spacers S for supporting the individual tire components 9 in or outside of said stacks. In this example, the one or more handling machines R1, R2 are robots. Alternatively, the handling machines R1, R2 may comprise conveyors, pick-and-place units or the like. Each handling machine R1, R2 is provided with a suitable tool, e.g. a gripper G1, G2, for engaging and/or retaining a tire component 9 and/or a spacer S. In particular, the first handling machine R1 is arranged for engaging a tire component 9, for example a bead-apex, and for transferring said bead-apex to a spacer S. The second handling machine R2 is arranged for engaging one or more spacers S of a stack of spacers S, each spacer S supporting a tire component 9, for example a bead-apex. The second handling machine R2 may lift a single spacer S or more than one spacer S simultaneously.

The tire building machine 1 further comprises an inspection station 2 for visual inspection of one or more of the tire components 9 produced in the tire building machine 1 by a human operator H. Although the inspection station 2 is used for inspection throughout this application, it will be apparent to one skilled in the art that the inspection station 2 is merely suitable for inspection and can alternatively be used to facilitate removal, reinsertion and/or replacement of articles or machine parts, for example for maintenance purposes, to take samples, to adjust for variations in the tire building process or to safely perform any interaction with the tire building machine 1 without interruption the tire building process. Such articles or machine parts may include the aforementioned tire components 9 or any other tire building related articles or tools, for example spacers, separators, gripper heads, or the like.

The inspection station 2 defines an inspection area A2. In this example, the inspection area A2 is located completely within or overlaps completely with the footprint F of the production area A1. Alternatively, the inspection area A2 may be located partially outside of or in partial overlap with the footprint F of the production area A1, provided that there is a direct connection between the production area A1 and the inspection area A2.

More in particular, as shown in FIG. 3, the inspection station 2 comprises an inspection station housing 20 that defines or bounds one or more sides of the inspection area A2. In this example, the inspection station housing 20 comprises three physical walls physically separating the inspection area A2 from the production area A1 in three directions parallel to a horizontal plane. One side of the inspection station 2 may be defined by the machine housing 10. It will be appreciated that if the inspection station 2 is located in a corner of the machine housing 10, two or more walls of the inspection station 2 may be formed by the machine housing 10.

As shown in FIGS. 1 and 2, the inspection station 2 is further provided with a first door 3 for physically separating the inspection area A2 from the production area A1. The inspection station housing 20 is open at the position of the first door 3 such that, when the first door 3 is opened, the inspection area A2 is freely accessible from the production area A1.

In particular, the first door 3 is movable between an open state, as shown in FIG. 1, in which the inspection area A2 is accessible from the production area A1 and a closed state, as shown in FIG. 2, in which the inspection area A2 is physically separated from the production area A1.

In this example, the first door 3 is located at a top T of the inspection station 2. The top T is the side of the inspection station 2 facing vertically upwards. As such, the first door 3, in the open state, opens the inspection area A2 for access in a pick-and-place direction P through a top T of the inspection station 2. Preferably, the pick-and-place direction P is vertical or substantially vertical. In particular, note that the second handling machine R2 in the production area A1 has a range or a freedom of movement sufficient to reach into the inspection station 2 from above, as shown in dashed lines in FIG. 1.

Alternatively, the first door 3 may be arranged at any other side of the inspection station 2 that is adjacent to the production area A1. In particular, the inspection station 2 may be provided with an alternative first door (not shown)

that provides access to the inspection station 2 in an alternative pick-and-place direction that is horizontal or substantially horizontal.

The tire building machine 1 is provided with a door drive 5, for example a pneumatic cylinder or a servo, that can be controlled to move the first door 3 between the open state and the closed state. More specifically, the first door 3 is hingably connected to or pivotable relative to the inspection station housing 20 about a hinge axis X. The door drive 5 acts on the first door 3 at a position spaced apart from said hinge axis X to open and close the first door 3 about said hinge axis X. Alternatively, the door drive 5 may act on the first door 3 at the hinge axis X. In yet a further alternative embodiment, the first door 3 may be opened and closed without hinging, for example by linearly sliding the first door 3 away or by lifting the first door 3 from the inspection station 2.

The first door 3 is a physical door. In other words, the first door 3 has a solid physical surface. The first door 3 may have a closed physical surface, it may be provided with a grating or it may have a combination of a closed physical surfaces and a grating thereof. Any grating is dimensioned such that the apertures therein stop most materials, objects and/or machine parts present or handled in the tire building machine 1 from passing through the first door 3 into the inspection station 2. The first door 3 is preferably made of a rigid and/or strong material, for example a metal such as steel. In particular, the first door 3 has sufficient thickness or strength to absorb impacts from materials, objects and/or machine parts hitting the first door 3.

As best seen in FIG. 1, the tire building machine 1 further comprises a door sensor 6 for detecting the closed state and the open state of the first door 3. The door sensor 6 may be a mechanical finger or an electronic sensor, such as a contact sensor, a proximity sensor or an optical sensor. Additionally or alternatively, the door sensor 6 may be configured to detect the open state of the first door 3.

The inspection station 2 further comprises a second door 4 for controlling human access to the inspection area A2 from outside the production area A1, i.e. from the environment external to and/or surrounding the tire building machine 1. The second door 4 is located at a side of the inspection station 2 different from the side that is opened and closed by the first door 3.

The second door 4 may be hingably connected to the machine housing 10. Alternatively, the second door 4 may slide or move away from the inspection station 2 in another suitable way. In this example, the second door 4 can be manually opened and closed by the human operator H.

The second door 4, like the first door 3, is a physical door and, as such, may have a closed physical surface, a grating or a combination thereof.

As best seen in FIGS. 1 and 2, the inspection station 2 includes an optional drawer 21 that can be moved to a position partially protruding outside of the inspection station 2 through the second door 4 when said second door 4 is opened, to present the one or more tire components 9 received thereon in a more convenient and/or ergonomic manner to the human operator H.

The inspection station 2 further includes a door lock 22 for locking and unlocking the second door 4. Optionally, the first door 3 may also be provided with a door lock (not shown). The door lock 22 is shown schematically as a hook that can be rotated to mechanically hook onto a locking pin that is fixed to the second door 4. Alternatively, the door lock 22 may include a mechanism and/or electronics that is integrated with the inspection station 2, the second door 4 and/or the machine housing 10, for example a mechanical, magnetic or electronic member that blocks retraction of a latch of the second door 4.

The tire building machine 1 is provided with an access request interface 23, for example a button, for requesting human access to the inspection area A2. The tire building machine 1 may further include a human machine interface 24, for example a touch screen or keyboard. The access request interface 23 may alternatively be incorporated as an element of said human machine interface 24. The human machine interface 24 may further provide feedback to the human operator H on the number of tire components 9 to be inspected, their specific order in the inspection station 2, the reason(s) for inspection, and/or on any information already collected by the tire building machine 1 about the tire components 9 to be inspected, such as images, scans, height profiles, splice analysis, measurements, materials, etc.

The tire building machine 1 according to the present invention is configured such that the first door 3 and the second door 4 are not open or cannot be opened simultaneously or at the same time during production of the tire components 9 in the production area A1. In other words, only one door 3, 4 of the first door 3 and the second door 4 can be opened at any time during production of the tire components 9 in the production area A1.

In particular, tire building machine 1 comprises a control unit 7 that is programmed, adapted, arranged and/or configured to control the tire building machine 1 such that the first door 3 and the second door 4 are not open or cannot be opened simultaneously during production of the tire components 9 in the production area A1. In particular, the control unit 7 is electronically and/or operationally connected to one or more of the aforementioned drives 5, sensors 6 and/or other devices 22 that control the operation of the tire building machine 1, including the opening, closing, locking and/or unlocking of the first door 3 and the second door 4. The control unit 7 comprises a memory, in particular a non-transitory tangible memory, e.g. a physical data carrier such as a hard-drive, a USB-drive, a RAM memory or the like, for storing computer-readable instructions. The control unit 7 further comprises a processor for executing the computer-readable instructions. The instructions, when executed by the processor, can cause the control unit 7 to control the tire building machine 1 in the aforementioned manner.

In particular, the control unit 7 is electronically and/or operationally connected to one or more of the door drive 5, the door sensor 6, the door lock 22, the access request interface 23 and the human machine interface 24.

The control unit 7 is electronically and/or operationally connected to the door lock 22 and the door sensor 6 for controlling the door lock 22 to unlock only when the door sensor 6 generates a signal indicative of the first door 3 being in the closed state.

The control unit 7 is electronically and/or operationally connected to the door drive 5 and the access request interface 23 for controlling the door drive 5 to move the first door 3 to the closed state in response to an access request at the access request interface 23. The control unit 7 may delay the closing of the first door 3 when the second handling machine R2 is in the process of placing or removing one or more tire components 9 at the inspection station 2. In such a scenario, the control unit 7 will wait for the earliest opportunity to close the first door 3.

When the first door 3 is in the closed state, as shown in FIG. 2, the control unit 7 may control the second handling machine R2 to wait with a new tire component 9 to be inspected until the first door 3 is opened again. Alternatively, the second handling machine R2 may temporarily store or buffer any new tire component 9 to be inspected in a waiting position until the first door 3 is opened again, or it may skip inspection altogether and just send the new tire component 9 to be inspected to a waste position.

A method for inspecting one or more tire components 9 produced in the aforementioned tire building machine 1 will now be briefly described with reference to FIGS. 1, 2 and 3.

FIG. 1 shows the situation in which the first door 3 is in the open state. Hence, the inspection area A2 is accessible from the production area A1. In particular, the second handling machine R2 can reach into the inspection area A2 to place or remove the one or more tire components 9, as shown in dashed lines. A stack of spacers S is placed in the inspection station 2 on the drawer 21. Each spacer S supports a tire component 9. The second door 4 is closed to prevent access by the human operator H to the inspection area A2. In particular, the second door 4 is actively locked by the door lock 22.

FIG. 2 shows the situation in which the human operator H has generated an access request signal via the access request interface 23. The control unit 7 has received the access request and checks if the first door 3 is in the open state and can be closed. When the first door 3 is ready to be closed, the control unit 7 controls the door drive 5 to move the first door 3 from the open state towards the closed state. The door sensor 6 is used to check if the first door 3 has successfully arrived in the closed state. In the situation as shown in FIG. 2, the first door 3 is in the closed state and the inspection area A2 is physically separated from the production area A1.

Then, the door lock 22 is released and the second door 4 can be opened, in this example manually. FIG. 2 shows the situation in which the second door 4 has already been opened. The inspection area A2 is now accessible for human access. In other words, the human operator H can safely reach into the inspection area A2 from outside the production area A1. In other words, the human operator H does not have to enter or reach through the production area A1 to access the inspection area A2. The drawer 21 has been pulled partially out of the inspection station 2 to visually and/or manually inspect the tire components 9.

Hence, the production process in the production area A1 can be continued without interruption. In other words, the production of the tire component 9 continues during the opening of the second door 4. More in particular, the production of the tire component 9 continues during visual or manual inspection of the tire component 9 by the human operator H in the inspection area A2.

As mentioned before, the first door 3 and the second door 4 cannot be opened simultaneously during production of the tire components 9 in the production area A1.

As part of the method, the human operator H is urged or required, for example via a protocol, to keep the tire components 9 in the stack in the same order. In other words, the stack, after completing the inspection, holds the tire components 9 in the same order as prior to starting the inspection. In this manner, the tire building machine 1 may assume that the order of the tire components 9 in the stack is still the same as it was prior to inspection and reintroduce the tire components 9 into the production process in accordance with the inspection results associated with the tire components 9 in said specific order.

Preferably, the control unit 7 is programmed, adapted, arranged and/or configured for controlling the second handling machine R2 such that the tire component 9, presented to the human operator H in the inspection area A2, is positioned in said inspection area A2 in such a way that an area of interest, for example a splice area, of said tire component 9 is facing towards the human operator H, i.e. towards the second door 4.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A tire building machine for producing tire components, the tire building machine comprising:
    a machine housing that defines a production area and an inspection station,
    one or more handling machines in said production area,
    wherein the inspection station defines an inspection area for inspection by a human operator of one or more of the tire components produced in the tire building machine,
    wherein the inspection station is provided with a first door for physically separating the inspection area from the production area and a second door for controlling human access to the inspection area from outside the production area,
    wherein the first door is movable between a closed state in which the inspection area is physically separated from the production area and an open state in which the inspection area is accessible from the production area,
    wherein the first door, in the open state, opens the inspection area for access by at least one of the one or more handling machines, and
    wherein the one or more handling machines are operable to reach into the inspection area from the production area to place or remove the one or more tire components.

2. The tire building machine according to claim 1, wherein the first door, in the open state, opens the inspection area for access in a pick-and-place direction through a top of the inspection station.

3. The tire building machine according to claim 1, wherein the tire building machine is provided with a door drive for moving the first door between the closed state and the open state.

4. The tire building machine according to claim 1, wherein the tire building machine comprises a door sensor for detecting one of the closed state and the open state of the first door.

5. The tire building machine according to claim 1, wherein the production area has a footprint, wherein the inspection area at least partially overlaps with the footprint of the production area.

6. The tire building machine according to claim 5, wherein the inspection area is located completely within the footprint of the production area.

7. The tire building machine according to claim 1, wherein the tire building machine is provided with an access request interface for requesting human access to the inspection area.

8. The tire building machine according to claim 1, wherein the tire building machine comprises a door lock for locking and unlocking the first door or the second door.

9. The tire building machine according to claim 1, wherein the tire building machine is configured such that the first door and the second door are not open simultaneously during production of the tire components in the production area.

10. The tire building machine according to claim 1, wherein the tire building machine comprises a control unit that is configured to control the tire building machine such that the first door and the second door are not open simultaneously during production of the tire components in the production area.

11. The tire building machine according to claim 10, wherein the tire building machine comprises a door lock for locking and unlocking the second door and a door sensor for detecting one of a closed state and an open state of the first door, wherein the control unit is operationally connected to the door lock and the door sensor for controlling the door lock to unlock only when the door sensor generates a signal indicative of the first door being in the closed state.

12. The tire building machine according to claim 10, wherein the tire building machine is provided with a door drive for moving the first door between a closed state and an open state and an access request interface for requesting human access to the inspection area, wherein the control unit is operationally connected to the door drive and the access request interface for controlling the door drive to move the first door to the closed state in response to an access request at the access request interface.

13. The tire building machine according to claim 1, wherein the first door is a physical door.

14. The tire building machine according to claim 1, wherein the first door has a closed physical surface, a grating or combination thereof.

15. The tire building machine according to claim 1, wherein the second door is a physical door.

16. The tire building machine according to claim 1, wherein the second door has a closed physical surface, a grating or a combination thereof.

17. The tire building machine according to claim 1, wherein the inspection station is provided with a drawer that can be partially pulled out of the inspection area through the second door.

18. A method for inspecting one or more tire components produced in a tire building machine according to claim 1, wherein the method comprises the steps of:

placing the one or more tire components from the production area into the inspection area;

using the first door to physically separate the inspection area from the production area; and opening the second door for human access to the inspection area from outside of the production area when the inspection area is physically separated from the production area.

19. The method according to claim 18, wherein the production of the tire components continues during the opening of the second door.

20. The method according to claim 18, wherein the production of the tire components continues during visual or manual inspection of the one or more tire components by the human operator in the inspection area.

21. The method according to claim 18, wherein the first door and the second door are not opened simultaneously during production of the tire components in the production area.

22. The method according to claim 18, wherein the first door is movable between a closed state in which the inspection area is physically separated from the production area and an open state in which the inspection area is accessible from the production area, wherein the method further comprises the steps of:

locking the second door; and unlocking the second door only when the first door is in the closed state.

23. The method according to claim 18, wherein the method further comprises the step of:

closing the first door in response to an access request of the human operator.

24. The method according to claim 18, wherein the method further comprises the steps of:

forming a stack of two or more of the tire components in the inspection area for inspection by the human operator;

starting and completing the inspection by the human operator; and reintroducing the two or more tire components from the stack in the inspection area into the production area;

wherein the human operator performs the inspection in such a way that the stack, after completing the inspection, holds the two or more tire components in the same order as prior to starting the inspection by the human operator.

* * * * *